(12) United States Patent
Perera et al.

(10) Patent No.: US 8,178,020 B2
(45) Date of Patent: May 15, 2012

(54) MULTICOMPONENT TEXTILE FIBERS, METHODS FOR THEIR PRODUCTION, AND PRODUCTS MADE USING THEM

(75) Inventors: Willorage Rathna Perera, Raynham, MA (US); Gerald J. Mauretti, Fall River, MA (US)

(73) Assignee: Pascale Industries, Inc., Pine Pluff, AR (US)

( * ) Notice: Subject to any disclaimer, the term of this patent is extended or adjusted under 35 U.S.C. 154(b) by 228 days.

(21) Appl. No.: 12/219,324

(22) Filed: Jul. 18, 2008

(65) Prior Publication Data
US 2009/0065969 A1   Mar. 12, 2009

Related U.S. Application Data

(60) Provisional application No. 60/935,056, filed on Jul. 24, 2007.

(51) Int. Cl.
*D01D 5/30* (2006.01)

(52) U.S. Cl. ......... 264/172.11; 264/172.15; 264/172.17; 264/DIG. 26

(58) Field of Classification Search ............. 264/172.11, 264/172.15, 172.17, DIG. 26
See application file for complete search history.

(56) References Cited

U.S. PATENT DOCUMENTS

| | | | | |
|---|---|---|---|---|
| 4,065,280 A * | 12/1977 | Kao et al. | ......... | 65/413 |
| 4,193,782 A * | 3/1980 | Aulich et al. | ......... | 65/502 |
| 5,451,355 A * | 9/1995 | Boissonnat et al. | ......... | 264/136 |
| 5,814,122 A * | 9/1998 | Huang | ......... | 65/393 |
| 5,948,196 A * | 9/1999 | Huang | ......... | 156/167 |
| 7,655,175 B2 * | 2/2010 | Michael et al. | ......... | 264/465 |
| 2005/0094954 A1 * | 5/2005 | Pickrell et al. | ......... | 385/123 |
| 2005/0141834 A1 * | 6/2005 | Murofushi | ......... | 385/123 |
| 2005/0155389 A1 * | 7/2005 | Ho et al. | ......... | 65/401 |
| 2007/0053640 A1 * | 3/2007 | Goell et al. | ......... | 385/123 |

* cited by examiner

*Primary Examiner* — Yogendra Gupta
*Assistant Examiner* — Amjad Abraham
(74) *Attorney, Agent, or Firm* — Michael de Angeli

(57) ABSTRACT

A fiber is produced comprising polymers of differing types which are not admixed during production. The differing polymer types are heated to the point of softening in a vertically-oriented crucible and a fiber comprising the polymers in positions corresponding to their positions in the crucible is drawn from an orifice at the lower end of the crucible.

2 Claims, 5 Drawing Sheets

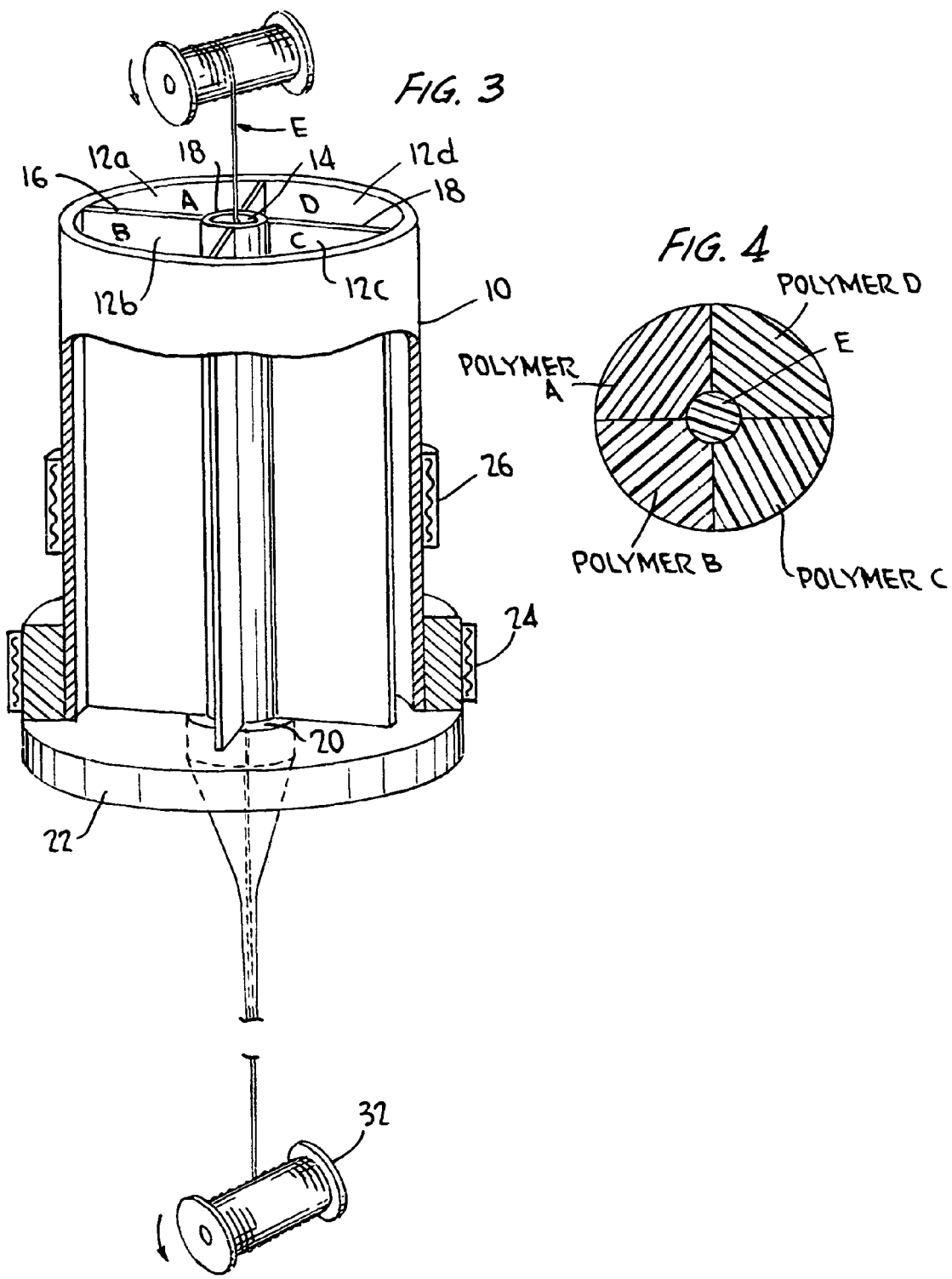

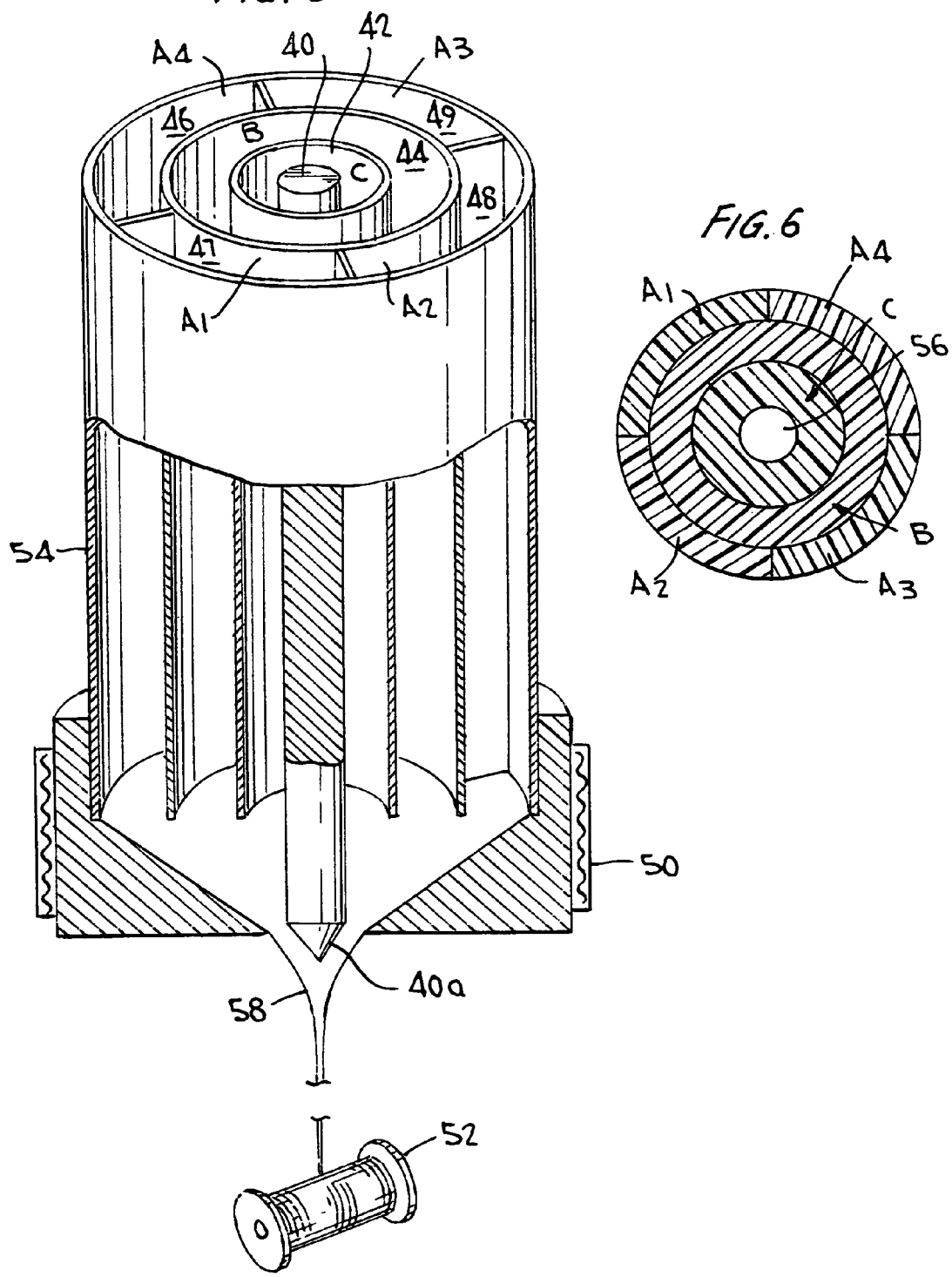

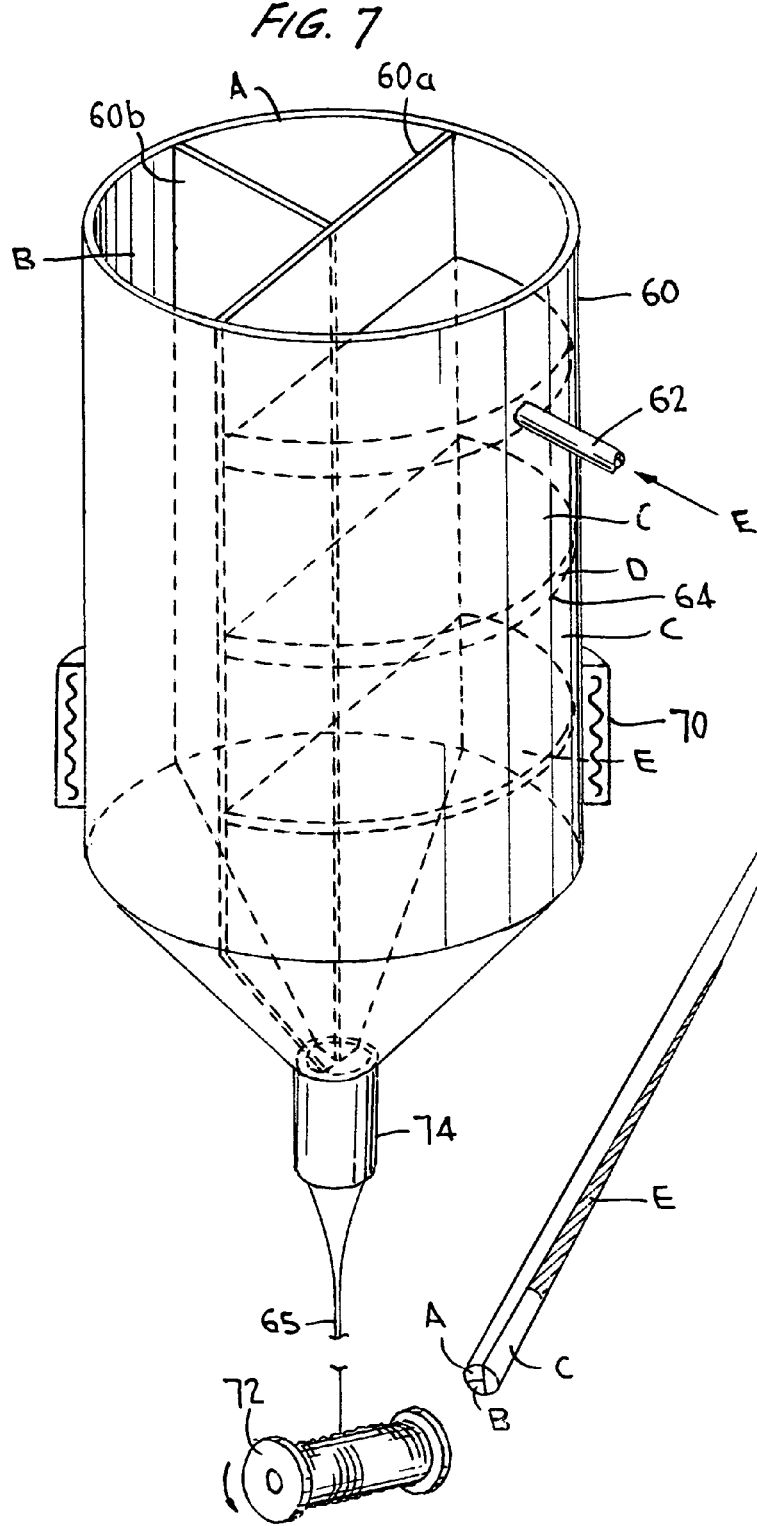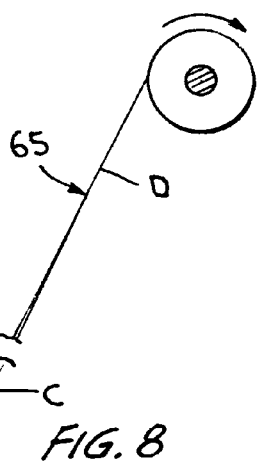
FIG. 7
FIG. 8

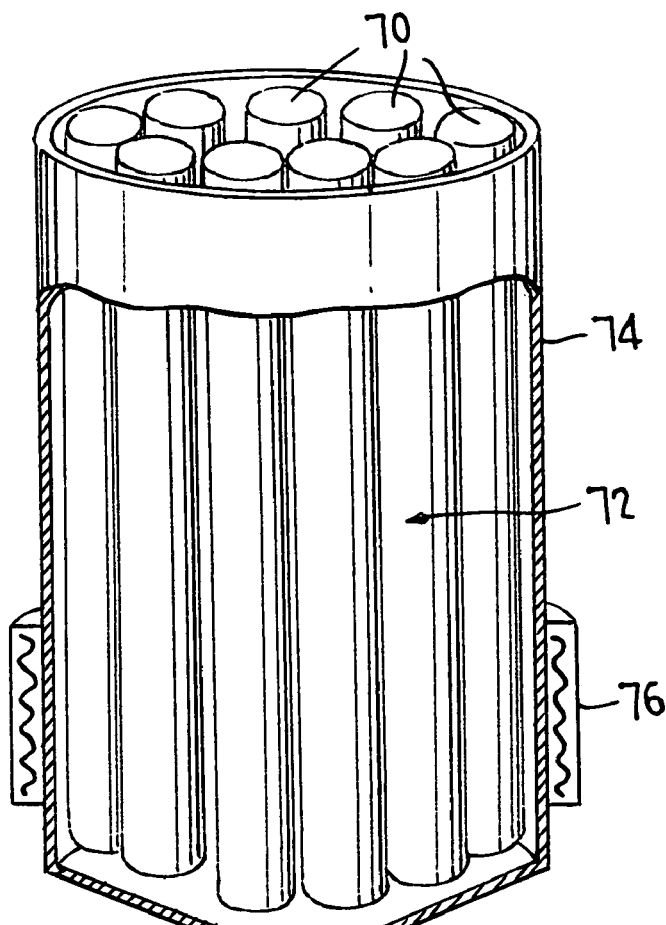
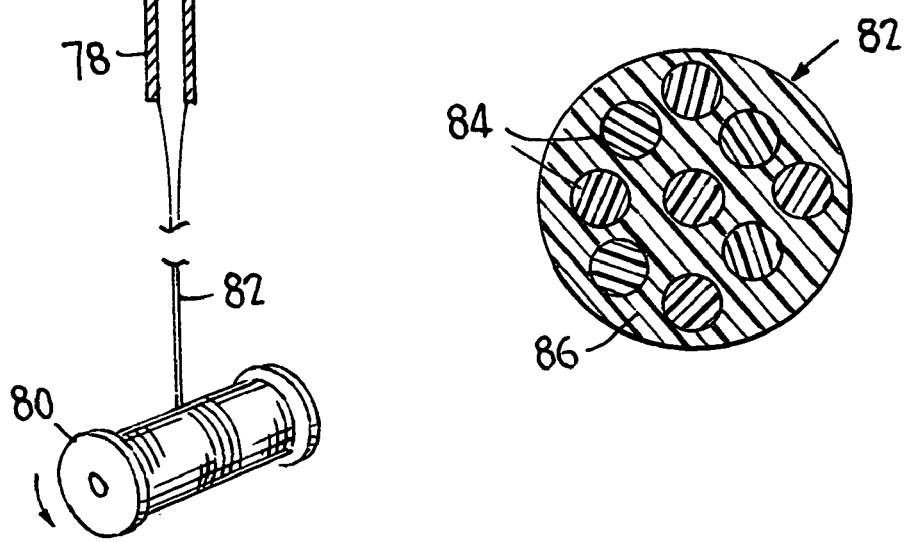

MULTICOMPONENT TEXTILE FIBERS, METHODS FOR THEIR PRODUCTION, AND PRODUCTS MADE USING THEM

CROSS-REFERENCE TO RELATED APPLICATION

This application claims priority from U.S. Provisional Patent Application Ser. No. 60/935,056, filed Jul. 24, 2007.

FIELD OF THE INVENTION

This application relates to novel fibers made using plural types of polymer material, so that the characteristics of the fiber can be optimized according to their intended use. The fibers are made by providing a crucible in which the desired polymer materials are heated to suitable temperatures, and then "codrawing" a fiber comprising components of each of the polymer materials. The polymers can be varied radially, that is, in concentric layers, circumferentially, that is, around the fiber, or axially, that is, along its length, and in combinations of these. The fiber may be formed over a central member, or have a hollow core, and may take any desired cross-sectional shape. The fibers thus made can be used in a variety of ways. For example, they can be spun or twisted into threads or yarns, which are then used for sewing, knitting, weaving, and other known processes.

BACKGROUND OF THE INVENTION

Polymer fibers of a wide variety of materials are of course well-known. Extrusion is much the most common process for producing such fibers. In the usual extrusion process, molten polymer is forced under relatively high pressure, typically on the order of hundreds of psi, through an extrusion die that is comparatively close in dimension to those of the finished fiber. More specifically, some swelling of the fiber may occur as it exits the die, and the fiber can be drawn down by application of tension. It is of course well-known to apply a polymer sheath to a substrate, e.g., to insulate a metallic wire, by passing the wire through the extrusion die and extruding the polymer sheath around the substrate.

In most cases homogenous fibers or sheaths, that is, manufactured of a single polymer material, are adequate for the intended purpose. Where a multiple-layer product is desired, that is, with a central core of a first polymer sheathed in a layer of second polymer, or where a wire or another substrate is to be coated in two different layers of polymer, this is typically accomplished by first forming a monofilamentary fiber, or sheathing a metallic substrate, in a first extrusion step and then adding the outer sheath in a second extrusion step, thus requiring multiple extruders and/or multiple cross heads. It would be difficult, at best, to make a filamentary product having two or more distinct polymer components in a single extrusion operation, as the pressure required to force the polymer materials through the extrusion die would cause the polymer materials to tend to become admixed with one another.

The present invention seeks to avoid these limitations on the conventional processes of forming filamentary polymer products.

SUMMARY OF THE INVENTION

According to the present invention, a filamentary or continuous-fiber product is manufactured of different polymer materials that do not tend to become admixed with one another during processing. This is accomplished by codrawing the polymer materials, under carefully chosen processing conditions, without a die per se. More specifically, the polymer materials may be drawn through an orifice that confines them to a degree as they exit the crucible in which they are melted, limiting the dimensions of the as-drawn fiber, but wherein the temperature, polymer melt strength at a given temperature, polymer stretchability, and draw speed have primary impact on the final dimensions. If required, reduction in the size of the filament exiting the orifice as needed to provide the desired final fiber dimensions is achieved by control of takeup speed, and controlling the polymer melt flow characteristics such that the fiber stretches lengthwise and is drawn down accordingly.

According to the invention, fibers can be manufactured of polymer materials of different properties. The fiber can be made to have polymers of varying properties in concentric radial layers, in different sectors around the fiber, or in different sections along its length. The polymers may have different engineering properties, so that the final fiber has several useful functional attributes, such as fire retardance or heat-sensitive adhesion, or different cosmetic properties, such as color, useful in fabricating textile products and the like.

Further according to the invention, the different polymers can be introduced in the fiber at manufacture by providing them at different sections of a multicompartmented crucible, or by sequentially introducing different polymers into supply lines connected to the sections of the crucible. The polymers are melted prior to entry into or within the crucible, and are drawn from an exit orifice; the melting is controlled such that the polymers are soft enough to be drawn readily, and are bonded to one another, but not to the extent that they intermix and lose their individual properties. In general, the crucible is arranged so that gravity provides the force urging the polymer through the orifice. If the polymer is supplied in liquid from an external melting vessel, at most very limited pressure is applied to the supply lines. This is a clear distinction from the usual high-pressure extrusion process, which would tend to cause the polymers to become intermixed with one another.

The fibers according to the invention can be formed over a core substrate, such as a polymer core, one or several electrical wires, a strengthening yarn, a light-guiding fiber, or a light-emitting fiber. For example, a two-conductor insulated electrical wire can be made by drawing the metallic conductors, spaced from one another, through a central passage in the crucible, so that they are insulated from one another; a second layer of a different polymer can then be added from a coaxial outer compartment of the crucible. The fibers of the invention may also be made tubular, by drawing the polymer components past a core member fixed in the exit orifice of the crucible.

Certain interesting applications of the fibers of the invention involve the optical properties of the polymer materials. For example, the properties of core and sheathing polymers can be chosen so that the core polymer acts as an electromagnetic wave guide, so that the method of the invention can be used to make a low-cost polymer fiber optic. The core can also be chosen from polymer materials which selectively absorb light of certain wavelengths, thus acting as an electromagnetic filter, allowing light of only selected wavelengths to pass. Such a "fiber filter", which would glow with only the light of wavelength within the passband when illuminated with white light, might be useful in product authentication or other applications.

The polymer material of the core can also be selected for its ability to have certain properties modified in response to an external source, such as laser radiation, so that selected sections of the core can be modified and different engineering properties can be achieved. For example, it may be possible to choose the polymers of the core and the cladding of the fiber such that the index of refraction in different sections of the fiber can be modified to make one or more "fiber Bragg gratings", whereby light within a selected band of wavelengths is reflected. This would allow different signals to be transmitted over a given fiber optic using light of different wavelengths, and the physical properties of the fiber employed to demultiplex the different signals.

BRIEF DESCRIPTION OF THE DRAWINGS

The invention will be better understood if reference is made to the accompanying drawings, in which:

FIG. 3 shows a view similar to FIG. 1, illustrating a further embodiment of the process of producing multicomponent polymer fibers according to the invention, a central substrate being provided in this embodiment;

FIG. 4 shows schematically the cross section of a fiber produced according to the method of FIG. 3;

FIG. 5 shows a view comparable to FIG. 1, in an embodiment where a hollow tubular fiber is produced;

FIG. 6 shows a cross-sectional view of the fiber produced using the method of FIG. 5;

FIG. 7 shows a view comparable to that of FIG. 1, in an embodiment wherein the characteristics of the polymer are to vary along the length of the fiber;

FIG. 8 shows the fiber produced using the method of FIG. 7;

FIG. 9 shows a partially cutaway view of a crucible and other components for practicing an alternative method of the invention; and FIG. 10 shows a cross-sectional view of the fiber produced by the method of FIG. 9.

DESCRIPTION OF THE PREFERRED EMBODIMENTS

Figure 1:
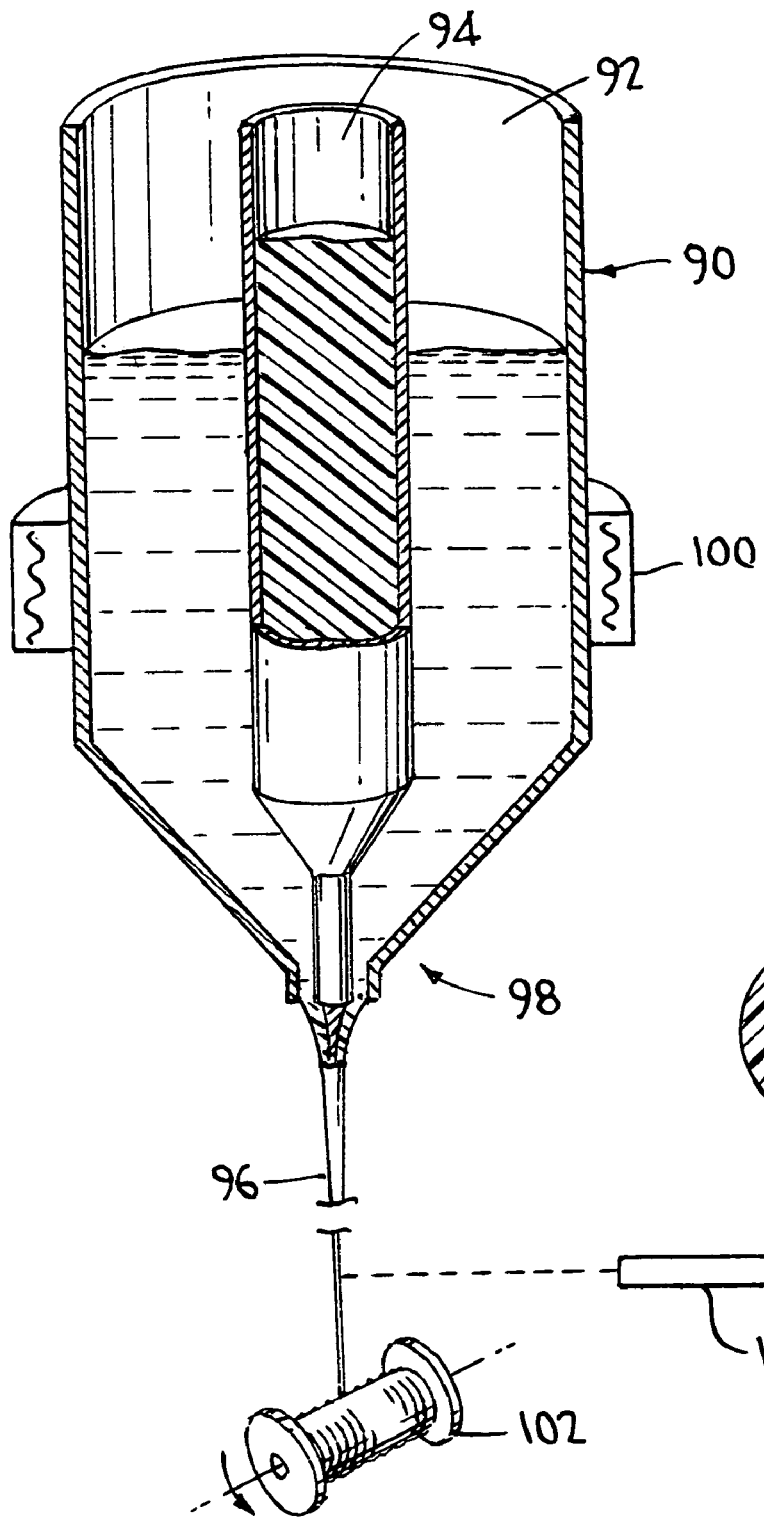
FIG. 1 shows schematically the process of producing multicomponent polymer fibers according to the invention, including a perspective schematic view of a multicompartmented crucible.
Figure 2:
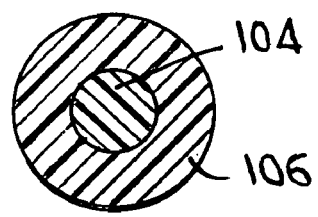
FIG. 2 shows schematically the cross section of a fiber produced according to the method of FIG. 1.

As described above, an objective of the invention is to manufacture a fiber or filament made up of plural types of polymeric material that do not intermix with one another during processing, such that their individual engineering and cosmetic properties are retained in the final product. FIG. 1 shows schematically a method and apparatus for doing so, and FIG. 2 shows the cross section of the product thus manufactured. Thus, in FIG. 1, there is provided a multicompartmented crucible 90. Crucible 90 is generally cylindrical overall, and is subdivided in this example into inner and outer compartments 94 and 92 respectively. The compartments 94 and 92 are filled with the polymers desired to form the inner core and outer sheath of a simple two-compartment fiber, illustrated at 96. Typically the polymers are supplied in granular form, necessitating the compartmentalization of the crucible. The lower ends of the compartments terminate at an orifice 98 comprising concentric inner and outer apertures. The polymers are heated to a suitable temperature by a band heater or other heat source 100. When the polymers have softened suitably, they begin to flow under the influence of gravity downwardly through the orifice 96. When the softened polymers begin to drip from the orifice, the fiber can be grasped (using a hand tool, for example) and pulled downwardly, stretching the fiber 96 and causing it to be drawn down in diameter. The end of the fiber can then be attached to a take-up spool 102, which is driven at a rate selected to achieve the final fiber diameter desired.

The resulting fiber, as shown in FIG. 2, comprises a core 104 of the polymer that had been disposed initially in the inner compartment 94 of crucible 90, surrounded by a sheath 106 of the second polymer that had been placed in the outer compartment 96. That is, the polymers are not commingled and retain their separate characteristics, unlike the result that would be obtained if they had been extruded in a single operation. The fact that the polymers retain their individual characteristics allows various products to be made that would not otherwise be possible. For example, as above it may be possible to make an inexpensive fiber optic of polymer materials using the technique of the invention; this requires that the core and sheath of the fiber have clearly distinct indices of refraction, which would be difficult to achieve if they were to be co-extruded. More specifically, it is possible to make a fiber optic using the method of the invention which comprises an acrylic core and a fluouropolymer sheath, which is an improvement over the all-acrylic fiber optics now available, as the fluouropolymer sheath is much more durable than an acrylic sheath. As above, it may even be possible to make a fiber Bragg grating by using the method of the invention to form a fiber optic, as above, and modifying the characteristics of the core locally using a laser 108.

FIGS. 3 and 4 illustrate a more complex embodiment of the invention, wherein the polymer fiber is formed over a central member, and moreover where several different polymers are used to form the sheath. Thus, the crucible 10 is subdivided into four outer segment-shaped compartments 12a-12d and a central passageway 14 by radially-extending, effectively cruciform partitions 16 and a central tubular member 18. Compartments 12a-12d are filled with the desired polymers A-D; the polymers can be supplied in granular form and melted in the crucible, or may be supplied after liquefaction elsewhere. The lower ends of the compartments 12a-12d are generally open, at least near the tubular member 18, and communicate with an exit orifice 20 formed in a crucible base 22. Base 22 is surrounded by a band heater 24, for heating the polymers to a desired temperature at which they are melted sufficiently to draw readily but are not so softened as to lose their cohesion and become difficult to process satisfactorily. A second band heater 26 may be provided for further temperature control.

As indicated, in this embodiment it is desired to form the multicomponent polymer fiber around a central substrate E, which might be a polymer monofilament, a strengthening yarn, one or more electrically conductive wires, a fiber optic, a light emitting fiber, or another elongated member. In one embodiment of interest, the inner and outer polymer materials can be chosen such that the inner polymer functions as a electromagnetic wave guide and the outer polymer functions as a fire retardant with day/night glow properties. Substrate E is passed through central tubular member 18, so that as it and the molten polymer materials exit orifice 20, the polymer materials A-D surround and adhere to the substrate E. Of course, substrate E might comprise a plurality of individual fibers, electrically or thermally conductive wires which might be parallel, twisted to form a yarn, or braided.

The crucible is oriented vertically such that the exit orifice 20 opens downwardly, so that when the polymer materials are properly softened by application of heat, gravity will cause them to begin to flow through the orifice 20. At that point the lowermost portion of the polymers extending from the orifice 20 can be grasped and pulled, along with the central substrate, if employed, so as to draw out the fiber thus exiting the orifice. As the fiber is drawn it will elongate. Typically the elongation takes place in the first few inches of motion after exiting the orifice 20; the polymer will have cooled from, e.g., 500 degrees F. to room temperature in the few seconds the fiber takes to travel this distance. The fiber can be further drawn in this or a subsequent step, at room temperature or at an elevated temperature, to provide improved tenacity, further contraction, and other desired physical properties. The end of the fiber can be secured to a takeup reel 32; reel 32 is driven at a speed selected with respect to the speed at which the fiber exits the orifice in order to provide the desired degree of elongation and thus to control the final dimensions of the fiber.

In the circumstance that a central substrate E of a material that does not elongate under the processing conditions needed for polymer drawing is to be used, a lubricant may be placed on the substrate E, so that the polymer coating can slide along the substrate E until the polymer is drawn to a desired thickness. Alternatively, the opening through which the polymer coating flows downwardly may be formed to define a ring-like aperture spaced away from the substrate, so that the polymer is pulled into engagement with the substrate as the substrate is pulled through the crucible. The coating thickness will be determined by the melt flow characteristics, temperature, size of the orifice, and the running speed. The fiber can also be passed between tension rollers and/or shaping rollers (not shown) to further control tension and thus elongation, and to impart any desired cross-sectional form to the fiber, e.g., to make a flat ribbon or tape.

FIG. 4 shows a schematic cross-sectional view of the fiber as thus formed, with four segments of different polymer materials A-D disposed around a central substrate E. The polymer materials A-D can be chosen from a wide variety of known materials, and for a variety of reasons. For example, the polymers making up a single fiber might include one exhibiting good adhesive properties, one exhibiting edge glow, one exhibiting night glow, and one having magnetic properties. Other polymers, such as those having desired dielectric or transparency properties, or having different colors, might be chosen instead. As noted, the substrate E could also be chosen from a wide variety of materials, e.g., a polymer monofilament, one or more metallic wires or braids, a strengthening yarn, or a fiber optic light guide.

For example, several electrically-conductive wires might serve as the substrate. If spaced apart from one another by a guide near the orifice at the lower extremity of the crucible, these would be insulated from one another by the polymer surrounding them. An outer concentric compartment in the crucible might be employed to further sheath the wires in another material, possibly selected for different properties.

In another example, the process of the invention might be usefully employed to form a tape with a large number of high-strength filaments of carbon or aramid effectively encapsulated in a polymer matrix, which would greatly simplify further processing and subsequent handling. The fibers would be passed down the central aperture, forming substrate E. As indicated above, concentric compartments in the crucible could be employed to provide inner and outer layers of different polymers in a single processing step; a first inner encapsulating layer might be provided to secure the fibers in the desired relationship to one another, and an outer layer of a heat-activated adhesive polymer could then be provided for use in securing the tape in place in a manufactured object. This tape could then be used to fabricate high-strength fabric products, e.g., sails, tarpaulins for tenting, and the like, with the tapes serving to carry tensile loads, by heat-laminating the tapes between layers of sheet material. In this case it would likely be useful to form the crucible and orifice in generally rectangular shapes so as to limit the amount of post-processing that would be required.

FIG. 5 illustrates a method and apparatus for forming a multicomponent fiber having a hollow lumen at its center and a different disposition of polymers than in FIG. 3, and FIG. 6 shows a cross-section of the resulting fiber. Thus, in FIG. 5, an inner solid rod 40 terminating in a conical point 40*a* is supported within the crucible 54, with the point 40*a* disposed within the orifice 58 of the crucible 54, so that as the polymer materials are drawn past point 40*a* a central lumen 56 remains in the fiber. Clearly the exact location of the tip of point 40*a* must be carefully selected with respect to the orifice 58, and the other processing conditions optimized, to ensure that the lumen remains open.

In the embodiment shown, as further illustrated by FIG. 5, a first polymer layer is formed by disposing a polymer C in a first inner compartment 42 of crucible 54, and a second layer is formed by disposing a second polymer B in a concentric outer compartment 44. Four separate polymers A1-A4, disposed in segmented compartments 46-49, then provide an outer sheath having four quadrants that may be formed of differing polymer types. It would of course be similarly possible to radially subdivide one or both of the inner concentric layers into segments, and/or to provide one or more outer layers of the same or different materials, by appropriate modification of the design of the crucible 54. All such modifications and combinations are within the skill of the art.

As above, the polymers are heated by at least one band heater 50, or the equivalent, until they are sufficiently softened as to flow properly, primarily under the influence of gravity; as they begin to do so, the material exiting orifice 58 can be grasped and secured to a takeup reel assembly 52. Again, the rate at which the takeup reel draws the fiber with respect to the rate at which the fiber exits the orifice 58 is the primary control input on the final dimensions thereof.

FIGS. 7 and 8 show yet a further embodiment wherein the characteristics of the polymer vary along the length of the fiber produced. There are many circumstances in which variation of the properties of a fiber along its length, e.g., its engineering properties, such as its flame retardance or adhesiveness, or its cosmetic properties, such as its color or reflectance, might be desirable. This can be accomplished as shown in FIG. 7, and the result is shown in FIG. 8.

As illustrated by way of example, crucible 60 of FIG. 7 includes a transverse partition 60*a* dividing the interior of the crucible in half; one side may be further subdivided by a second portion 60*b*. If the compartments thus formed are filled with first and second polymers A and B, the resulting fiber 65 will include continuous sections of polymers A and B, as illustrated in FIG. 8. The other side of the crucible may be filled with "preforms" (that is, solid members formed to fit the shape of the compartment) of further different polymers C, D, and E, as illustrated. The result would be to provide variation in the properties of the fiber along its length as it is drawn, again as shown by FIG. 8. Alternatively, one or more injection ports 62 can be provided at the wall of a crucible 60, so that layers of various desired polymers can be injected. In this case, the crucible might be capped to enable injection under pressure. However, as noted above, the injection pressure would be relatively low, to avoid intermixing of the various polymers. Alternatively, the polymers of differing types might simply be poured into the top of the crucible in the desired sequence. Again, a band heater 70 is provided to heat the polymer to a temperature appropriate for co-drawing to form the fiber, and a takeup-reel 72 is employed to control the degree to which the fiber exiting the orifice 74 is reduced in cross-sectional size.

If polymer of different characteristics is provided in vertical layers in the crucible as shown at 62 and 64 in FIG. 7, it will be distributed over comparatively long sections of the fiber thus made. This could be very useful. For example, a fiber of 6-10 mils diameter could be made wherein the properties of the fiber vary over a distance of 10-40 yards. If such a fiber were woven into a fabric, bands of the desired characteristic would appear in the fabric at spacings of a few tenths of an inch. That is, suppose polymer C is chosen for fire-retardant properties, and appears in sections of the fiber 20 yards long and repeating at 100 yard intervals. A fabric woven using this fiber would exhibit bands of fire-retardant capability at intervals of a fractions of an inch, which would be helpful in providing fire-retardance to a garment made thereof as a whole.

It should also be appreciated that the method of the invention, that is, codrawing of different polymer materials, can also be practiced using relatively large diameter "preforms", that is, solid polymer members, such as rods of one-quarter inch in diameter. See FIG. 9. This allows elimination of the necessity of subdividing the crucible into compartments, as needed where the polymer materials are supplied in granular form. As shown, a plurality of preforms 70 of differing polymer types are disposed in a bundle 72, placed in a crucible 74 fitted with a band heater 76, melted and drawn from an orifice 78 at the lower end of the crucible 74, to produce a single fiber 82 effectively comprising polymer fibers of differing types. The preforms can be vertical, as shown, horizontal, or a combination of both. For instance, rods of different polymers could be stacked together, with the interstices between the rods and the crucible filled with a granular polymer, and the assembly heated and drawn as above. The result would be a fiber having a number of strands 84 of desired materials in a matrix 86 of a further material, as shown in FIG. 10. Vertical preforms extending through holes bored in preform discs of polymers of different properties would yield a fiber with a plurality of strands in a matrix, and the properties of the matrix would vary along its length, as in FIG. 7. As noted, where the polymer is provided as solid "preforms", the crucible would not need to be subdivided into compartments. In this embodiment, as above, a central substrate could be incorporated if desired, or the fiber could be produced with one or more lumens.

It is also within the invention to bundle a large number of the fibers produced according to the invention together and coprocess them similarly to form a multifilamentary yarn with properties not available in a product made up of a single polymer.

As noted, the fibers produced according to the invention can be used in a wide variety of applications and to form a range of useful products, and these are accordingly also within the invention.

While several preferred embodiments of the invention have been described in detail, the invention is not to be limited thereto.

What is claimed is:

1. A method of production of a polymer fiber wherein a plurality of differing polymer types are provided as precursor materials and are not admixed during fiber production, whereby the properties of the differing polymer types are preserved in the final fiber, and wherein the properties of the polymers of the fiber vary along its length, comprising the steps of:

providing a vertically-oriented elongated crucible divided by radially- and vertically-extending partitions extending vertically substantially the entire length of the elongated crucible into a plurality of separate vertical compartments for receiving the differing polymer types, each of the compartments communicating at a lower end thereof with an orifice in the lower end of the crucible;

disposing quantities of the differing polymer types in the corresponding compartments in granular form, whereby quantities of different polymer materials are disposed within one or more of the compartments of the crucible one above one another, such that the polymer materials are not admixed with one another in the crucible, and are disposed within said one or more of the compartment so as to differ along the vertical length of the one or more compartments;

heating the crucible to a desired temperature at which each of the differing polymer types are softened to a desired degree;

codrawing a fiber comprising each of the polymer types, being disposed with respect to one another corresponding to the positions of the respective compartments in the crucible, from the orifice; and reeling the codrawn fiber onto a takeup reel, whereby a fiber is produced the properties of which vary along its length.

2. The method of claim 1, comprising the further step of controlling the rate of rotation of the takeup reel with respect to the rate at which the fiber is drawn from the orifice in order to control the final diameter of the fiber.

* * * * *